Oct. 26, 1943.  H. SCHMIDBERGER  2,332,938
AUTOMATIC MOLD FILLING DEVICE
Filed May 28, 1940  2 Sheets-Sheet 1

Inventor
*Heinrich Schmidberger,*
By
Attorney

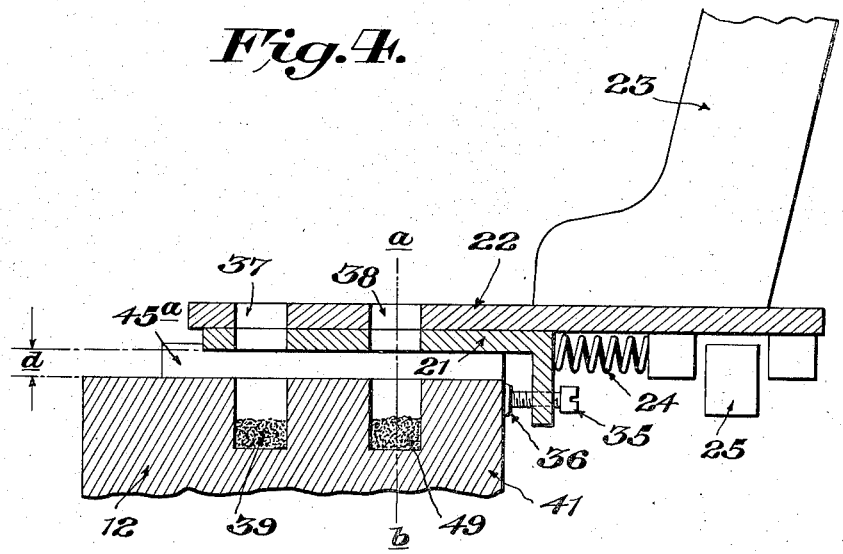
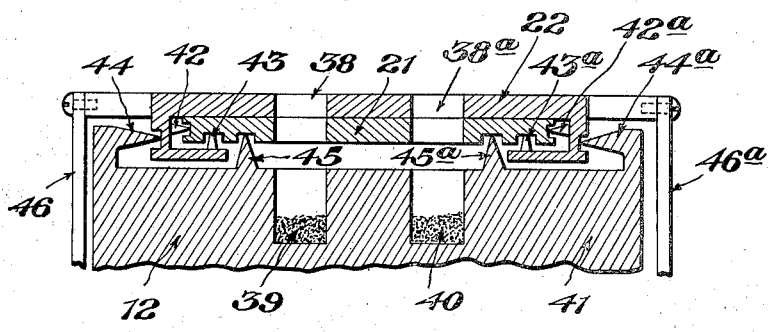

Patented Oct. 26, 1943

2,332,938

UNITED STATES PATENT OFFICE 2,332,938

AUTOMATIC MOLD FILLING DEVICE

Heinrich Schmidberger, Vienna, Germany; vested in the Alien Property Custodian

Application May 28, 1940, Serial No. 337,676
In Germany May 2, 1939

6 Claims. (Cl. 18—30)

For the production of pressed bodies from urea derivatives, phenol condensation products or other artificial resins one starts from a powder of granular material. In this form the press material is filled into the molds by means of suitable dosing devices and then subjected to a high pressure with simultaneous heating, until it begins to flow in the mold and fills it out evenly. The press material is then hardened, the mold opened and the pressed article ejected.

This invention relates to an automatic filling device for molds especially for fully automatic machines which serve for carrying out this method.

According to the invention a filling slide of known type is used for this purpose which filling slide has corresponding filling apertures and during the pressing operation is under the container for the material in order to be pushed over the matrix when the press is opened, so that the material drops through the filling apertures into the apertures of the matrix.

According to the invention this filling slide is associated with a closing slide below the filling slide so that these two slides move simultaneously and the movement of the closing slide, when the filling device is pushed in between the press rams, retards relative to the filling slide only when the filling apertures of the filling slide are above the mold apertures of the matrix, and that neither the filling slide nor the closing slide come into direct heat contact with the heated elements of the press.

In this manner the filling device cannot be smeared and stuck in position by wastes from the press material. Firstly the short sliding movement of the closing off slide relative to the filling slide is substituted for the usually long sliding movement of the filling slide in tablet presses on its support packing the filling apertures, and secondly it is possible to keep both the filling slide and the closing off slide absolutely cool on this movement, so that the press material has no opportunity to smear. To avoid the filling device consisting of the filling slide and of the closing slide from being stuck or jammed on the common sliding path, it is advisable to construct this path as a sliding path for knife edge guiding with two planes standing perpendicularly the one to the other.

In order that the invention may be well understood an embodiment thereof will now be described by way of example only applied to a completely automatic molding press for artificial resin molding powder, with reference to the accompanying drawings in which:

Figure 3 is a detailed side-view, in part-section, of the filling device in Figures 1 and 2, Figure 4 is a detailed view in part-section of the filling device, and Figure 5 is a section-view of Figure 4 taken across the line ab.

Figure 1:
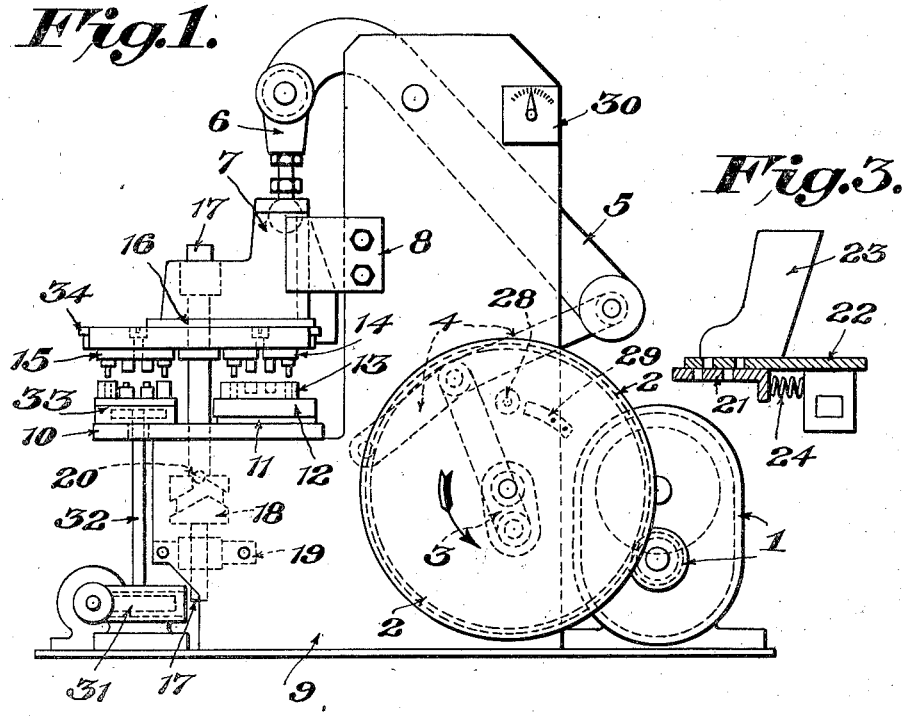
Figure 1 is a side-elevation of the press.
Figure 2:
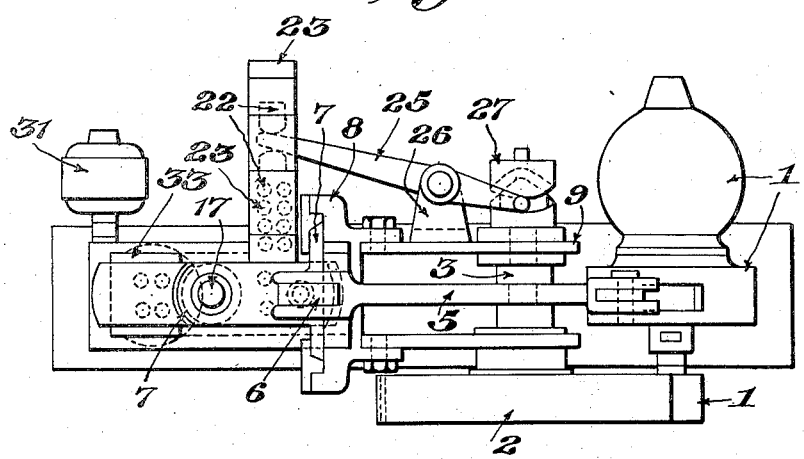
Figure 2 is a plan view.

Figures 1 and 2 illustrate a fully automatic press for artificial resin at a moment just prior to the driving crank shaft 3 reaching its lower dead centre position. The driving assembly 1 of this press consists of an electric motor with flanged slide coupling and pinion, which pinion meshes with a toothed wheel 2 keyed on to the crank-shaft 3. The crank-shaft 3 operates a toggle lever system 4, which moves the press slide 7 up and down through a thrust lever 5 and a hinged member 6, which is adjustable in length.

The press-slide 7 is guided in a slide guide 8 which is fixed to the frame 9. The press-slide carries on its underside a heated plate 34 which is rotatable about an axle 17 the two being separated by an interposed insulation plate 16. On the rotatable plate 34 are mounted two male or plunger members 14 and 15 of similar type. A matrix 13 is screwed on to a hot plate 12, which is connected to a press table 10 with interposition of an insulation plate 11. The press table 10 further carries an unscrewing device 33, by which the prepared pressed articles are unscrewed from the plunger and which is driven by a special gear 31 through a shaft 32.

The shaft 17 extends downwards to the bearing 19 and carries a slot guide 18 which co-acts with a fixed roller 20. With the aid of this slot guide the rotary plate 34 is rotated in the same direction by 90° at a time on lowering as well as on raising the press slide 7 so that the plunger member 14 and the plunger member 15 co-operate alternately with the matrix 13.

In the time during which a new set of molded articles is produced between matrix and plunger, the previously prepared set of pressed articles can therefore be unscrewed from the plunger member 14 or 15 with the aid of the device 33.

A curved slot guide 27 is provided on the crank-shaft 3 and controls the filling device 22—24 through the lever 25 pivotally mounted at 26, this device filling the cavities in the matrix 13 afresh before every pressing process with the necessary amount of molding material. A finger 29 mounted on the toothed wheel 2 opens the circuit of the driving unit 1 by means of a switch 28 and switches in a stop-clock 30 as soon as the crank-shaft 3 is in the lower dead centre position. After the stop-clock 30 has run down the motor starts up again, so that the press slide 7 is again moved upwards and thereby swings the rotary plate 34 through 90°. At this instant the filling device 22—24 slides inwardly and fills the matrix afresh with molding material. Then the press slide 7 goes downwards again thereby swinging the rotary plate once more through 90° by means of the slot guide 18 and the process is repeated.

Details of the filling device according to the invention are illustrated in Figure 4 and Figure 5. The filling slide 22 and the closure plate 21 are shown in longitudinal section in the position which they take up at the instant of charging the matrix 13.

At this instant an impacting screw 35 mounted on the closure plate 21 has struck a stop 36 provided on the matrix 13, so that the closure plate 21 is left behind relative to the filling slide 22 and uncovers the filling openings 37, 38 of the latter. The molding material which previously had fallen out of the storage vessel 23 into these filling openings 37, 38, falls thus into the cavities of the matrix 13 and forms there small heaps 39, 40. When the filling slide 22 travels again to the right under the action of the lever 25, the closure plate 21 returns into the position with respect to the filling slide shown in Figure 3 under the influence of the spring 24, so that the filling openings 37, 38 are then again closed at the bottom and may be filled up again from the storage vessel 23.

It is to be noted that only a small sliding path between the underside of the filling slide 21 and the upperside of the closure plate 21 is necessary. Both the upperside of the closure plate, and the underside of the filling slide are carefully polished, and are preferably of hard chromium steel in order to effect a clean closure and opening of the filling apertures 37, 38 of the filling slide 22. It will also be noted that between the filling device 21, 22 and the heated matrix 13 there remains a slight distance $d$ even when the matrix is charged, so that the filling device does not come into heat contact with the heated parts of the press. The heat contacts between the screw 35 and the stop 36 may be neglected.

Figure 5 shows a section on line $a$—$b$ through the filling device shown in Figure 4. As shown, the closing slide 21 can be locked relative to the filling slide 22 and also the filling slide 22 relative to the stationary table 41 fixed on frame 9. Each slide is guided by two pairs of knife edged guides 42; 42a; 43; 43a; 44; 44a; 45 and 45a having sliding planes extending perpendicularly the one to the other. All these knife edged guides are preferably hard chromed and consist of straight knife edges which run in relatively broad tracks of approximately rectangular cross section. It has been found that guides of such a kind remain clean even under unfavourable conditions since artificial resins do not stick to chromium. Sheet metal flaps 46 and 46a may in addition be mounted at the sides of the filling slide 22.

I claim:

1. A mold filling device comprising a horizontally movable top plate containing a cavity for receiving material, a bottom plate arranged for slide-fit surface contact with the top plate containing means for blocking said cavity in the top plate, guide tracks in said bottom plate disposed along opposite edges and at the bottom thereof, knife-edge means carried by said top plate for engaging the guide tracks in said bottom plate, guide tracks in said top plate disposed along opposite edges thereof, a stationary bed, knife-edge means carried by the stationary bed for engagement with the guide tracks in said top plate, and knife edge means on said bed for engagement with guide tracks in said bottom plate.

2. The device and structure defined in claim 1, together with means for moving said plates in common, and means effective during said movement for stopping said bottom plate to free the cavity in said top plate by movement thereof relative to the stopped bottom plate.

3. In combination, a horizontally disposed top plate, a bottom plate disposed underneath the top plate in slide-fit surface contact therewith, a bed plate, and a device for mounting said top and bottom plates above said bed plate and spaced therefrom and for sliding movement in common and for sliding movement relative to each other, said device comprising knife-edge means extending downwardly from said top plate for engagement with the bottom plate at two points disposed perpendicular to each other, and knife-edge means projecting from said bed plate for engaging said top plate at two opposite edges thereof and said bottom plate at two points along its bottom surface.

4. In an automatic molding press, a filling plate containing a material receiving aperture, material carrying means disposed above said filling plate for depositing material in said material receiving aperture, a closing plate in surface slide fit engagement with the bottom of said filling plate, said closing plate containing a companion aperture which is normally out of alignment with said material receiving aperture so as to retain material deposited therein, a bed plate, means for movably mounting said closing plate relative to said filling plate comprising a guide groove in each longitudinal edge of said closing plate, a guide groove at the bottom of said closing plate near each longitudinal edge thereof, an angular extension depending downwardly from each longitudinal edge of said filling plate and overhanging the longitudinal edges of said closing plate and knife-edge means projecting inwardly from said extensions depending from said filling plate for engagement with the guide grooves of said closing plate, and a device for mounting said filling plate and said closing plate for movement in common on said bed plate comprising two oppositely disposed guide grooves one in each side of said longitudinal extensions depending from said filling plate, a pair of guide grooves in the bottom of said closing plate, and knife-edge means projecting from said bed plate for engagement with said last noted guide grooves in said filling plate extensions and in the bottom of said closing plate.

5. The structure and combination defined in claim 4, wherein each of said guide grooves is of rectangular shape and is engaged by the knife-edge of the corresponding knife-edge means coacting therewith.

6. The structure and combination defined in claim 4, together with means acting on said filling plate for moving said filling plate and said closing plate in common relative to said bed plate, and stop means depending from said closing plate for engagement with the bed plate so as to stop the movement thereof while continuing the movement of said filling plate to obtain alignment of the apertures in said filling and said closing plates to dispose of the material retained in the aperture in said filling plate by dropping it through the aperture in said closing plate.

HEINRICH SCHMIDBERGER.